United States Patent [19]

Trujillo

[11] Patent Number: 5,015,446
[45] Date of Patent: May 14, 1991

[54] CATALYST RETAINER FOR AN ELONGATED TUBE

[75] Inventor: Sheldon G. Trujillo, Vidor, Tex.

[73] Assignee: Texaco Chemical Company, White Plains, N.Y.

[21] Appl. No.: 443,675

[22] Filed: Nov. 30, 1989

[51] Int. Cl.$^5$ ............................................... B01J 8/00
[52] U.S. Cl. .................................... 422/312; 422/311; 422/197
[58] Field of Search ............... 422/312, 311, 196, 197, 422/130, 80; 248/231.2, 231.9

[56] References Cited

U.S. PATENT DOCUMENTS 3,034,869  5/1962  Peterson ............................. 422/311
4,481,154  11/1984  Gough et al. ........................ 422/312

Primary Examiner—David L. Lacey
Assistant Examiner—Abanti B. Singla
Attorney, Agent, or Firm—Robert A. Kulason; James J. O'Loughlin; Robert B. Burns

[57] ABSTRACT

In a reactor tube for conducting a stream of gas through a bed comprised of particulated solid treating material, which is held within the tube. A retainer is removably positioned in the tube to secure the bed in place without obstructing the gas flow. The retainer includes a head which functions as a gas pervious barrier, yet precludes removal or carrying away of the particulated solid material. A tensioned loop at the retainer end includes a pair of oppositely positioned arms to engage the conductor inner wall. The arms are depressible to increase internal tension on the loop thereby allowing the retainer to be inserted into a tube end and held by friction.

2 Claims, 1 Drawing Sheet

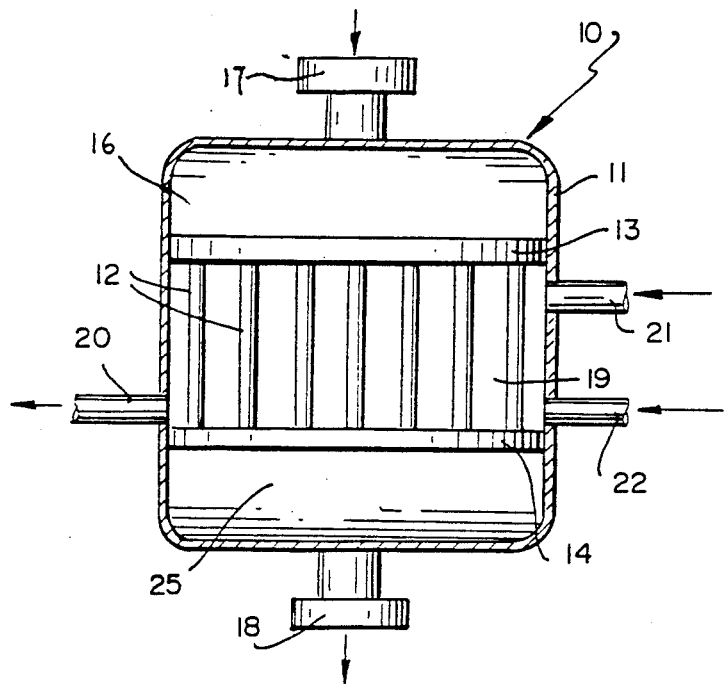
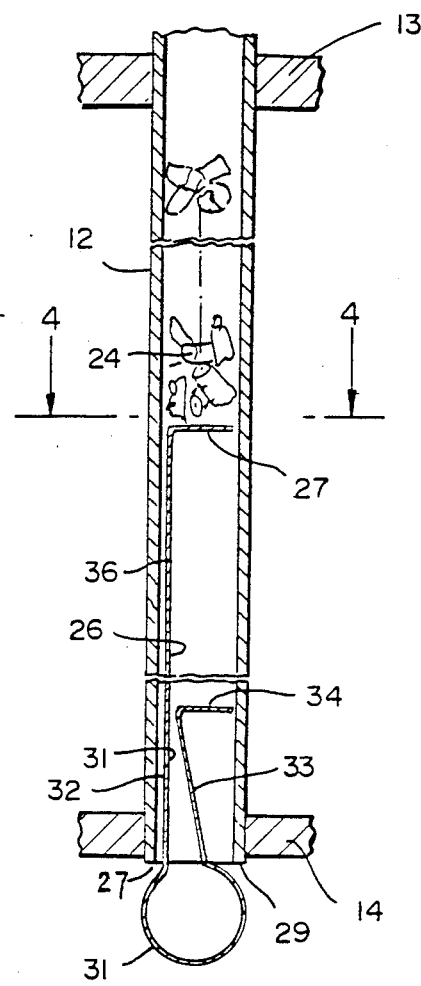
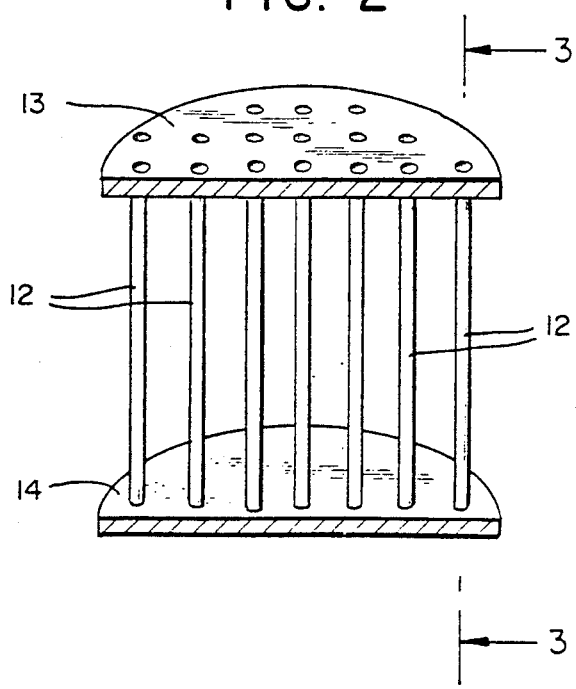
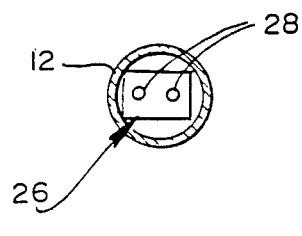

CATALYST RETAINER FOR AN ELONGATED TUBE

BACKGROUND OF THE INVENTION

Field of the Invention

The invention pertains to a reactor having one or more tubes for conducting a gaseous flow through a bed of a particulate solid material held within the tubes. The bed in one embodiment can include a particulated catalyst material that contacts the gas flow and prompts or supports a desired reaction.

The use of catalytic materials in reactors is a well known concept. Catalysts can assume many forms and characteristics depending on the function in a particular process or form of apparatus. Physically, the catalyst can be used in the form of rods, cylinders, powder, spheres, tubes, etc. In any instance, the catalyst material is usually aggregated into a compact though porous bed through which the gas, or even a liquid must pass to thereby enhance the desired reaction.

As with any catalyst, over a period of time it will lose its strength or effectiveness. The catalyst must therefore, after a sufficient degree of deterioration, be rejuvenated or be replaced.

Depending on the use to which it is applied, a reactor for treating a particular gas can be comprised of several thousand tubes each of which holds a small catalytic bed through which the gas flow will pass. The catalyst bed is maintained in the tube in a manner to allow the process gas to flow freely through it. In the instance of a reactor wherein the various gas conducting tubes are arranged in a general upright disposition, the catalyst bed must be held in place by a suitable yet convenient means. Said means will function to restrain the catalyst particles from being carried away on the gas stream, but will not hinder the treated gas flow.

When, after a period of usage, it becomes necessary to replace or rejuvenate the catalyst, normally the latter is removed from the gas conducting tubes. This of course necessitates closing down the process and the reactor, both of which steps can be time consuming and expensive.

One widely used means for retaining a catalyst bed in a gas conducting tube is through use of a coiled, spring-like member. The latter is inserted into the lower end of an upright reacted tube. The coils of the spring will support the catalytic bed and yet permit treated gas to flow through the spring's coiled openings.

Removal of the coiled retaining spring and subsequently the catalyst material from several thousand reactor tubes can be prolonged over a period of days. Further, special tooling is usually required to engage the retainer spring and to withdraw it from its position in a tube.

STATEMENT OF THE INVENTION

In the instant arrangement, there is provided a retainer which is self locking in the end of a reactor tube. The retainer is capable of partial insertion into a reactor tube end which holds a catalytic bed that will be exposed to a gaseous flow. The metallic, high temperature resistant retainer is comprised of a retainer head which is urged into a position where it will accurately locate and support the bed. The retainer head constitutes a gas permeable, partial closure that can be perforated, and will permit gas flow, but will maintain the particulated bed in place even under high temperature conditions.

The retainer further includes an elongated handle having a tension loop segment that is conformed into a shape which will permit it to be deformed to a desired size. Such deformation will allow an engaging tang to enter the tube end, after which the loop is relaxed. Release of the handle tension will allow the engaging tang to firmly contact the inner wall of the tube, thereby locking the retainer in place.

The retainer handle which protrudes from the tube end can now facilitate removal of both retainer and catalyst bed.

DESCRIPTION OF THE DRAWINGS

FIG. 1 is an elevation view in cross section illustrating a multi-tube reactor in which the disclosed catalyst retainer can be embodied.

FIG. 2 is a segmentary view of the reactor's tube bundle with the reactor shell removed and prior to insertion of the catalyst retainer.

FIG. 3 is a cross sectional view on an enlarged scale through line 3—3 in FIG. 2.

FIG. 4 is a cross-sectional view taken along line 4—4 of FIG. 3.

Referring to the drawings, to illustrate the invention, but not to impose an unnecessary limitation thereon, a reactor 10 of the type shown is one wherein a reactor shell 11 encloses a series of parallel gas conducting tubes 12. The latter are fastened within the enclosing shell 11 by two or more spaced apart tube sheets 13 and 14. The latter extend outwardly to the shell wall, where they are sealed at a fluid tight joint.

Reactor shell 11 is normally fabricated of steel having a sufficiently thick wall to withstand the expected internal pressures and temperature. Upper tube sheet 13 is fastened to the shell 11 inner wall, defining an upper chamber 16 having an inlet 17 for incoming process gas. Upon entering the chamber 16, the gas will be under sufficient pressure to be urged through the respective tubes 12.

The lower end of shell 11 includes a discharge chamber 25 defined between lower tube sheet 14 and the shell lower end piece. Upon leaving the respective tubes 12, process gas will enter discharge chamber 25 and be further passed through discharge opening 18 into downstream equipment for further treatment.

To accommodate a heating medium such as steam or another hot gas, the central or tube chamber 19 of the shell 11 is provided with at least one and preferably with a plurality of inlet ports 21 and 22 through which the heating medium will be injected. After contacting the respective tubes 12, seal media will leave central chamber 19 by way of one or more discharge ports 20.

Referring to FIG. 3, the normal construction of catalyst containing tubes 12 includes an upper end which is welded, soldered or otherwise sealed into openings formed in upper tube sheet 13. In a similar manner, the lower ends of the respective tubes 12 are fastened into lower tube sheet 14 thereby providing multiple passages communicating upper and lower chambers 16 and 25 respectively.

Conducting tubes 12 are normally fabricated of steel of a sufficient size and quality to function under the conditions of the incoming process gas, and the heating media entering tube chamber 19. Each tube as noted, is furnished with a catalyst bed 24 which extends for a desired length in the tube to provide the necessary treating or contact period for gas which flows through bed 24.

As shown in FIG. 3, catalyst bed 24 is comprised generally of a batch of cylindrical shaped, discrete pieces which are inserted into the top end of tube 12 to normally substantially fill the tube and define the catalyst bed. These catalyst particles are designed and formed to provide the necessary flow path for the process gas stream passing through the tube reaction chamber.

The catalyst is maintained at a desired height above the lower face 29 of tube 12 by bed supporting retainer 26. Said member as shown includes primarily a retainer head 27 which, when the retainer is properly in place, is positioned transversely of tube 12 flow passage. To assure that gas flow is permitted through bed 24 and discharged from the tube 12 lower end, retainer head 27 can be provided with perforations 28 and its edges designed to be spaced from the contiguous inner walls of tube 12.

The lower end of retainer 26 includes a handle or gripping means which serves a dual purpose. Firstly the retainer is provided with a handle which is formed to define a tension loop 31 or similar configuration. The latter is such that an appropriate tool can be inserted for the purpose of removing the retainer from tube 12 lower end, merely by pulling downward on the tension loop 31.

The loop 31 is shown in the configuration of a partial circle, and includes a pair of arms 32 and 33. The shorter arm 33 is positioned adjacent to lower face of the tube and includes an engaging tang 34. The latter is so positioned that it be urged against the inner wall of the tube when spring tension in the loop 31 is released.

For inserting retainer 26 into the lower end of tube 12, and as shown in FIG. 3, tension loop 31 is initially compressed to a reduced diameter by drawing shorter arm 33, a sufficient distance toward the longer arm 32 or extended shank 36. This action will increase spring tension in loop 31 and consequently the reactant forces on the arms. Retainer head 27 can now be inserted into the tube lower end. Shank 36 of retainer is formed of a sufficient length to properly position the catalyst bed 24 a desired distance from the lower end of the tube 12. Thus, as retainer 26 is urged into the tube lower end, and prior to insertion of the catalyst bed material, retainer head 27 is properly located when the loop 31 shoulder segment 37 abuts the lower face 29 of tube 12 thereby precluding further insertion of the retainer. At this point, tension loop 31 which has been compressed, upon release of the arms the tension loop will urge the tang 34 outwardly into engagement with the tube's inner surface. Frictional engagement between tang 34 and the tube wall will be sufficient to immobilize the retainer in place.

As can be appreciated, when a large number of reactor tubes 12 are involved, the disclosed retainer 26 can readily be inserted into the lower end of any number of tubes 12 prior to insertion of the catalyst material from the tube upper end at tube sheet 13.

Under actual operating conditions it has been found that through use of the disclosed retainer 26, both the loading and the discharging of the catalyst material can be achieved within a fraction of the previous time required. In instances of the previously used methods, the time involved and the tooling necessary to achieve proper insertion and removal of the catalyst retainer, constituted an impractical and expensive procedure.

It is understood that, although not presently shown, a similar partial closure member can be inserted into the upper end of tube 12 adjacent to the top of the catalyst bed 24. While this top inserted member will not function as a support element, it will nonetheless be readily inserted or removed from a tube end as required.

It is further understood that although modifications and variations of the invention can be made without departing from the spirit and scope thereof, only such limitations should be imposed as are indicated in the appended claims.

I claim:

1. In a reactor tube having an end face, and an inner wall defining a flow channel, in which a particulated bed is retained to contact a gaseous stream flowing through the tube, the improvement therein comprising:
    a retainer (26) removably positioned in said tube and comprising:
    an end wherein said end further comprises a retainer head (27) disposed transversly of said flow channel, said retainer head having a perforated barrier portion that allows said gaseous stream to pass therethrough, while deterring the passage of particulated material from said bed,
    an extended shank 36 having an upper end extending downwardly from said retainer head and also having a lower end,
    said lower end further extending downwardly and connected to a tension loop (31) whereby said tension loop (31) is in abutment with said tube end face, and further extending out of said tube end face,
    said tension loop (31) further connected to an arm (33) extending in an upwardly direction therefrom, whereby, said arm is spaced away from said extended shank (36) and is capable of being displaced toward said extended shank (36) to increase tension in said tension loop (31) and,
    said arm (33) having a second end having a tang (34) extending from said arm (33) and engaging the tube inner wall.

2. In the reactor as defined in claim 1, wherein said retainer head and handle are comprised of a single strip of metallic material.

* * * * *